United States Patent
Lapra et al.

(10) Patent No.: US 7,718,717 B2
(45) Date of Patent: May 18, 2010

(54) TYRE RUBBER COMPOSITION BASED ON A REINFORCING METAL HYDROXIDE

(75) Inventors: Arnaud Lapra, Saint-Saturyin (FR); Franck Varagniat, Ceyrat (FR); Anne Veyland, Marsat (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 734 days.

(21) Appl. No.: 11/631,820

(22) PCT Filed: Jul. 6, 2005

(86) PCT No.: PCT/EP2005/007281
§ 371 (c)(1),
(2), (4) Date: Jan. 8, 2007

(87) PCT Pub. No.: WO2006/002993
PCT Pub. Date: Jan. 12, 2006

(65) Prior Publication Data
US 2007/0254983 A1    Nov. 1, 2007

(30) Foreign Application Priority Data
Jul. 7, 2004   (FR) .................................. 04 07667

(51) Int. Cl.
*C08K 9/02*   (2006.01)
(52) U.S. Cl. ...................... 523/216; 524/444; 524/456; 524/442
(58) Field of Classification Search ................. 523/216; 524/444, 456, 442
See application file for complete search history.

(56) References Cited

U.S. PATENT DOCUMENTS

| 6,130,283 | A | 10/2000 | Nippa et al. |
| 6,610,261 | B1 | 8/2003 | Custodero et al. |
| 7,041,265 | B2 * | 5/2006 | Ishida et al. ................. 423/331 |
| 2008/0171811 | A1 * | 7/2008 | Guiselin et al. ............. 523/216 |
| 2009/0191387 | A1 * | 7/2009 | Paul et al. ................. 428/195.1 |
| 2009/0297827 | A1 * | 12/2009 | Lapra et al. ................. 428/323 |

FOREIGN PATENT DOCUMENTS

JP    2000/302914    10/2000

* cited by examiner

*Primary Examiner*—Margaret G Moore
(74) *Attorney, Agent, or Firm*—Buchanan Ingersoll & Rooney PC

(57) ABSTRACT

A rubber composition usable for the manufacture of tyres, based on at least a diene elastomer, a reinforcing filler and a coupling agent, characterised in that said filler comprises a synthetic metal hydroxide covered with silica, the metal of the hydroxide being selected from the group consisting of Al, Fe, Mg and mixtures of these metals. Use as reinforcing filler, in a diene rubber composition, of such a metal hydroxide. The metal hydroxide is preferably constituted of aggregates (secondary particles) of anisometric form, the primary particles possibly themselves being of anisometric form, for example in the form of rods, which imparts to the compositions of the invention anisotropic properties which are advantageous for separating their mechanical properties. Use of such a rubber composition for the manufacture of rubber articles, in particular of tyres or semi-finished products made of rubber intended for these tyres, in particular of treads.

33 Claims, No Drawings

TYRE RUBBER COMPOSITION BASED ON A REINFORCING METAL HYDROXIDE

The present invention relates to diene rubber compositions usable for the manufacture of tyres or semi-finished products for tyres, in particular of treads for these tyres, and to the reinforcing inorganic fillers capable of reinforcing such rubber compositions.

So as to reduce fuel consumption and the pollution emitted by motor vehicles, major attempts have been made by tyre designers to obtain tyres having all of the following: very low rolling resistance, improved adhesion both on dry ground and on wet or snow-covered ground, and good wear resistance.

Numerous solutions have in particular been proposed in the past for lowering the rolling resistance and improving the grip of tyres, but these generally result in very significant decline of the wear resistance.

In particular, it is well known that although the incorporation of conventional white fillers such as, for example, conventional silicas or aluminas, chalk, talc, natural aluminosilicates such as bentonite or kaolin, in rubber compositions used for the manufacture of tyres and in particular of treads, does result in a reduction in the rolling resistance and an improvement in adhesion to wet, snow-covered or icy ground, it also results in an unacceptable decline in the wear resistance, linked to the fact that these conventional white fillers do not have a sufficient reinforcement ability with respect to such rubber compositions. For this reason, these white fillers are generally referred to as non-reinforcing fillers, also referred to as inert fillers.

One effective solution to this problem of insufficient wear resistance has been found due to the development, in the last ten years, of new rubber compositions comprising truly reinforcing inorganic fillers, in particular highly dispersible silicas referred to as "HDS" (for "Highly Dispersible Silica"), which have proved capable of replacing conventional carbon blacks for tyres.

The compositions based on HD silica however have the known drawback of having very substantially slower vulcanisation kinetics, as a general rule slower by a factor of two to three, compared with conventional compositions filled with carbon black. It is known that the longer curing times which result adversely affect the industrial processing of tyres or treads for tyres based on such compositions.

Now, the Applicants have discovered during their research that there are other types of reinforcing inorganic filler, in this case specific metal hydroxides, of synthetic type, which may also be used in rubber compositions as true reinforcing fillers, that is to say ones which are capable of replacing conventional carbon blacks for tyres such as HD silicas.

Unexpectedly, these specific synthetic metal hydroxides offer not only an excellent reinforcement ability to the rubber compositions containing them, owing to a high dispersion ability, close to those available with HD-type silicas, but also improved vulcanisation kinetics compared with the use of such silicas.

Consequently, a first subject of the invention relates to a rubber composition based on at least a diene elastomer, a reinforcing filler and a coupling agent, characterised in that said filler comprises at least a synthetic metal hydroxide covered with silica, the metal of the hydroxide being selected from the group consisting of Al, Fe, Mg and mixtures of these metals.

This metal hydroxide is preferably formed of aggregates (or secondary particles) of anisometric form, which may impart to the compositions of the invention anisotropic properties which are advantageous for certain applications.

Another subject of the invention is the use, as reinforcing filler, of a reinforcing metal hydroxide as defined above in a diene rubber composition.

The subject of the invention is also a process for obtaining a rubber composition having improved vulcanisation kinetics, usable for the manufacture of tyres, in which there are incorporated in at least one diene elastomer at least a reinforcing inorganic filler and a coupling agent providing the bond between the reinforcing inorganic filler and the elastomer, this process being characterised in that said inorganic filler comprises a "reinforcing" metal hydroxide (i.e. one having all the aforementioned characteristics), and in that the entire mixture is kneaded thermomechanically, in one or more stages, until a maximum temperature of between 110° C. and 190° C. is reached.

Another subject of the invention is the use of a composition according to the invention for the manufacture of finished articles or semi-finished products made of rubber, and also these finished articles and semi-finished products themselves, comprising a rubber composition according to the invention, these articles or products being intended in particular for any ground contact system for automobiles, such as tyres, internal safety supports for tyres, wheels, rubber springs, elastomeric joints and other suspension and anti-vibration elements.

A very particular subject of the invention is the use of a rubber composition according to the invention for the manufacture of tyres or semi-finished rubber products intended for these tyres, these semi-finished products being selected in particular from the group comprising treads, underlayers intended for example to be positioned beneath these treads, crown plies, sidewalls, carcass plies, beads, protectors, inner tubes and airtight internal rubbers for tubeless tyres.

The composition according to the invention is particularly suited to the manufacture of treads for tyres intended to be fitted on passenger vehicles, vans, 4×4 vehicles (having 4 driving wheels), two-wheeled vehicles, "heavy vehicles" (that is to say subway trains, buses, road transport machinery (lorries, tractors, trailers), off-road vehicles), aircraft, construction, agricultural or handling machinery, these treads being able to be used in the manufacture of new tyres or for retreading worn tyres.

Reduced curing times are in particular advantageous for treads intended for retreading, be it "cold" retreading (use of a precured tread) or conventional "hot" retreading (use of a tread in the uncured state). In this latter case, a reduced curing time, in addition to the fact that it reduces the production costs, limits the overcuring (or post-curing) imposed on the rest of the casing (carcass) of the worn tyre (already vulcanised).

The invention and its advantages will be readily understood in the light of the description and the examples of embodiment which follow.

I. MEASUREMENTS AND TESTS USED

I-1. Characterisation of the Reinforcing Fillers

The fillers described hereafter consist of agglomerates of particles, which are liable to disagglomerate into these particles under the effect of an external force, for example under the action of mechanical working or ultrasound. The term "particle" used in the present application must be understood in its usual generic sense of "aggregate" (also referred to as "secondary particle"), and not in that of an "elementary particle" (also referred to as "primary particle") which may form, if applicable, part of this aggregate; "aggregate" is to be understood, in known manner, to mean the non-splittable unit (i.e. which cannot be cut or divided) generally formed of elementary (primary) particles which are aggregated together, produced during synthesis of the filler.

These fillers are characterised as indicated hereafter.

a) BET Specific Surface Area:

The BET specific surface area is determined by adsorption of gas using the method of Brunauer-Emmett-Teller described in "*The Journal of the American Chemical Society*" Vol. 60, page 309, February 1938, more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17].

b) Average Particle Size $d_w$:

The average size (by mass) of the particles, $d_w$, is measured in known manner after ultrasound dispersion of the filler to be analysed.

Measurement takes place using a optical detection centrifugal sedimentometer type "DCP" ("Disc Centrifuge Photosedimentometer"), sold by Brookhaven Instruments, used in particular in known manner for characterising particles of carbon black. The apparatus is equipped with an LED source which emits in the spectral band of between 600 and 700 nm.

The operating method is as follows. A suspension of 20 to 200 mg of sample of filler to be analysed is produced (preferably, 20 mg if M=Fe; 100 mg if M=Al; 200 mg if M=Mg) in 40 ml of aqueous solution containing 12 g/l of sodium hexametaphosphate as stabiliser for the suspension, by action over 8 min., at 60% power (60% of the maximum position of the "output control"), of a 1500 W ultrasound probe (Vibracell ¾-inch ultrasound generator sold by Bioblock under the reference M75450). To limit heating during ultrasound generation, the suspension is preferably placed in a bath of cold water (for example at a temperature of 5 to 10° C.). After ultrasound generation, 15 ml of the suspension is introduced into the rotating disc. After sedimentation for 120 minutes, the mass distribution of the particle sizes is calculated by the software of the "DCP" sedimentometer; the average by mass of the particle sizes, $d_w$, is calculated by the software from the following equation (with $n_i$ being the number of objects in the class of diameter $d_i$):

$$d_w = \frac{\sum_{i=1}^{n} n_i d_i^4}{\sum_{i=1}^{n} n_i d_i^3}$$

The calculation performed by the software uses a specific optical correction which takes account of the complex refractive index of the metal M of the hydroxide (n*=1.65+0.1.i for M=Al; n*=1.574+0.1.i for M=Mg; n*=2.375+0.1.i for M=Fe), of the refractive index of the suspension medium and the spectral characteristics of the source/detector pairing provided by Brookhaven Instruments. The refractive index of the suspension medium as a function of the wavelength of the LED source is obtained in known manner, by linear interpolation between the values of refractive indices of water at 20° C.: 1.3322 at 620 nm and 1.3305 at 690 nm. This optical correction is generated by means of the program DCP_SCAT.exe from Brookhaven Instruments.

c) Disagglomeration Rate α:

The disagglomeration rate (a) is measured in what is called the "ultrasound disagglomeration test", at 70% power of a 600 W (watt) probe, operating here in pulse mode (namely 1 second ON, 1 second OFF) to avoid excessive heating of the ultrasound probe during measurement. This known test, which is the subject in particular of patent application WO99/28376 (see also WO99/28380, WO00/73372, WO00/73373), makes it possible to measure continuously the change in the average size (by volume) of the agglomerates of particles during ultrasound generation, in accordance with the specifications hereafter.

The setup used consists of a laser granulometer (type "Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600-watt ½ inch ultrasound generator type Vibracell sold by Bioblock).

A small quantity, generally of between 20 and 200 mg, of filler to be analysed (for example 40 mg for M=Fe; 80 mg for M=Al; 150 mg for M=Mg) is introduced into the preparer with 160 ml of water, the rate of circulation being set to its maximum. At least three consecutive measurements are made to determine the initial mean diameter (by volume) of the agglomerates, referred to as $d_v[0]$, in accordance with the known Fraunhofer calculation method (Malvern 3$$D calculation matrix). The ultrasound generation (pulse mode: 1 sec ON, 1 sec OFF) is then established at a power of 70% (namely 70% of the maximum position of the "tip amplitude") and the change in the mean diameter by volume $d_v[t]$ as a function of the time "t" is monitored for about 8 minutes with one measurement approximately every 10 seconds. After an induction period (about 3-4 minutes), it was noted that the reciprocal of the average diameter by volume $1/d_v[t]$ varies linearly, or substantially linearly, with the time "t" (stable disagglomeration conditions). The disagglomeration rate α is calculated by linear regression of the curve of evolution of $1/d_v[t]$ as a function of the time "t", within the zone of stable disagglomeration conditions (generally, between about 4 and 8 minutes). It is expressed in $\mu m^{-1}/min$.

The aforementioned application WO99/28376 describes in detail a measuring device usable for performing this ultrasound disagglomeration test. It will be recalled that this device consists of a closed circuit within which a flow of agglomerates of particles suspended in a liquid can circulate. This device essentially comprises a sample preparer, a laser granulometer and a treatment cell. A vent to atmospheric pressure, at the level of the sample preparer and of the treatment cell itself, permits continuous elimination of the air bubbles which form during ultrasound generation (action of the ultrasonic probe).

The sample preparer ("Malvern Small Sample Unit MSX1") is intended to receive the sample of filler to be tested (in suspension in its liquid) and to send it through the circuit at the pre-controlled speed (potentiometer—maximum speed of approximately 3 l/min), in the form of a flow of liquid suspension. This preparer consists simply of a receiving tank which contains, and through which circulates, the suspension to be analysed. It is equipped with a stirrer motor of variable speed in order to prevent sedimentation of the agglomerates of particles of the suspension; a centrifugal mini-pump is intended to circulate the suspension in the circuit; the entrance to the preparer is connected to the open air via an opening intended to receive the sample of filler to be tested and/or the liquid used for the suspension.

To the preparer there is connected a laser granulometer ("Mastersizer S"), the role of which is to measure continuously, at regular intervals, the average size by volume "$d_v$" of the agglomerates as the flow passes, by means of a measuring cell to which are coupled the automatic recording and calculation means of the granulometer. It should be recalled here briefly that laser granulometers utilise, in known manner, the principle of diffraction of light by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of light diffracted for different angles of diffraction to be able to determine the size distribution (by volume) of the sample, $d_v$ corresponding to the average size by volume of this distribution ($d_v = \Sigma(n_i d_i^4)/\Sigma(n_i d_i^3)$ with $n_i$ being the number of objects of the size class or diameter $d_i$).

Inserted between the preparer and the laser granulometer there is, finally, a processing cell equipped with an ultrasonic probe, capable of operating in continuous or pulse mode, intended continuously to break up the agglomerates of particles as the flow passes. This flow is thermostatically controlled by means of a cooling circuit arranged, at the level of the cell, in a double casing surrounding the probe, the temperature being controlled, for example, by a heat sensor immersed in the liquid at the level of the preparer.

I-2. Characterisation of the Rubber Compositions

The rubber compositions are characterised, before and after curing, as indicated below.

a) Tensile Tests:

These tests make it possible to determine the elasticity stresses and the properties at break. Unless indicated otherwise, they are effected in accordance with French Standard NF T 46-002 of September 1988. The true secant moduli (i.e. calculated reduced to the real section of the test piece), expressed in MPa, at 100% elongation (moduli marked M100) and at 300% elongation (moduli marked M300), are measured in a first elongation (i.e. without an accommodation cycle—the moduli are then marked "M").

The breaking stresses (in MPa) and the elongations at break (in %) are also measured. All these tensile measurements are effected under normal conditions of temperature and humidity (23±2° C.; 50±5% relative humidity—French Standard NF T 40-101 of December 1979).

b) Dynamic Properties:

The dynamic properties are measured on a viscoanalyser (Metravib VA4000), in accordance with ASTM Standard D5992-96. The response of a sample of vulcanised composition (cylindrical test piece of a thickness of 2 mm and a section of 315 mm²), subjected to an alternating single sinusoidal shearing stress, at a frequency of 10 Hz, at a temperature of 23° C. is recorded. Scanning is effected at an amplitude of peak-to-peak deformation of 0.1 to 50% (outward cycle), then of 50% to 0.1% (return cycle); for the return cycle, the maximum value of the loss factor, $\tan(\delta)_{max}$, is recorded.

c) Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanisation reaction. The measurements are processed in accordance with DIN Standard 53529—part 2 (March 1983). Ti (in min.) is the induction delay, that is to say, the time necessary for the start of the vulcanisation reaction. The conversion rate constant K (in min⁻¹) of order 1, calculated between 30% and 80% conversion, is also measured, which makes it possible to assess the vulcanisation kinetics (the higher K is, the faster are the kinetics).

II. CONDITIONS OF IMPLEMENTATION OF THE INVENTION

The rubber compositions according to the invention are based on the following constituents: (i) a (at least one) diene elastomer, (ii) a (at least one) reinforcing filler and (iii) a (at least one) coupling agent providing the bond between this filler and this diene elastomer, said filler comprising a reinforcing metal hydroxide as described in detail hereafter.

Of course, the expression "composition based on" is to be understood to mean a composition comprising the mix and/or the product of reaction of the different base constituents used, some of these constituents being able to and/or being intended to react together, at least in part, during the different phases of manufacture of the composition, or during the later curing thereof.

In the present description, unless expressly indicated otherwise, all the percentages (%) indicated are mass %.

II-1. Diene Elastomer

"Diene" elastomer or rubber is understood in known manner to mean an elastomer originating at least in part (i.e. a homopolymer or a copolymer) from diene monomers, that is to say monomers bearing two double carbon-carbon bonds, whether conjugated or not.

These diene elastomers may be placed in two categories: "essentially unsaturated" or "essentially saturated". Generally "essentially unsaturated" is understood to mean a diene elastomer resulting at least in part from conjugated diene monomers, having a content of members or units of diene origin (conjugated dienes) which is greater than 15% (mole percent); thus diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood in particular to be meant by diene elastomer capable of being used in the compositions according to the invention:

(a) any homopolymer obtained by polymerisation of a conjugated diene monomer having 4 to 12 carbon atoms;
(b) any copolymer obtained by copolymerisation of one or more dienes conjugated together or with one or more vinyl aromatic compounds having 8 to 20 carbon atoms;
(c) any ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) any copolymer of isobutene and isoprene (butyl rubber), and also the halogenated, in particular chlorinated or brominated, versions of this type of copolymer.

Although it applies to any type of diene elastomer, the person skilled in the art of tyres will understand that the present invention, in particular when the rubber composition is intended for a tyre tread, is preferably used with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and from 1% to 80% by weight of vinyl aromatic units. The elastomers may have any microstructure, which is a function of the polymerisation conditions used, in particular of the presence or absence of a modifying and/or randomising agent and the quantities of modifying and/or randomising agent used. The elastomers may for example be block, random, sequential or microsequential elastomers, and may be prepared in a dispersion or in solution; they may be coupled and/or starred or alternatively functionalised with a coupling and/or starring or functionalising agent.

Polybutadienes are suitable, and in particular those having a content of 1,2-units of between 4% and 80%, or those having a cis-1,4 content of more than 80%, polyisoprenes, butadiene/styrene copolymers and in particular those having a styrene content of between 5% and 50% by weight and more particularly between 20% and 40%, a content of 1,2-bonds of the butadiene fraction of between 4% and 65%, a content of trans-1,4 bonds of between 20% and 80%, butadiene/isoprene copolymers and in particular those having an isoprene content of between 5% and 90% by weight and a glass transition temperature (Tg, measured in accordance with ASTM D3418) of −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and more particularly between 10% and 40%, an isoprene content of between 15% and 60% by weight, and more particularly between 20% and 50%, a butadiene content of between 5% and 50% by weight and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, the diene elastomer of the composition according to the invention is preferably selected from the group of highly unsaturated diene elastomers which consists of polybutadienes (abbreviated to "BR"), synthetic polyisoprenes (IR), natural rubber (NR), butadiene copolymers, isoprene copolymers and mixtures of these elastomers. Such copolymers are more preferably selected from among the group consisting of butadiene/styrene copolymers (SBR), isoprene/butadiene copolymers (BIR), isoprene/styrene copolymers (SIR) and isoprene/butadiene/styrene copolymers (SBIR).

The composition according to the invention is in particular intended for a tread for a tyre, be it a new or a used tyre (case of retreading).

When such a tread is intended in particular for a passenger-car tyre, the diene elastomer is preferably an SBR or an SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used, this SBR copolymer, which is preferably prepared in solution (SSBR), possibly being used in a mixture with a polybutadiene (BR) having preferably more than 90% cis-1,4 bonds.

According to another particular embodiment, the diene elastomer is majoritarily (to more than 50 phr) an isoprene elastomer. This is the case in particular when the compositions of the invention are intended to constitute, in tyres, the rubber matrices of certain treads, (for example for industrial vehicles, crown reinforcement plies (for example working plies, protective plies or wrapping plies), carcass reinforcement plies, sidewalls, beads, protectors, underlayers, blocks of rubber and other internal rubbers providing the interface between the aforementioned zones of the tyres.

"Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, in particular greater than 99%, are used.

According to another advantageous embodiment of the invention, in particular when it is intended for a tyre sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer(s) possibly being used in association with any type of synthetic elastomer other than a diene elastomer, or even with polymers other than elastomers, for example thermoplastic polymers.

II-2. Reinforcing Metal Hydroxide

The hydroxide used as reinforcing filler in the composition of the invention is a filler of hybrid or composite type, consisting of a synthetic metal hydroxide covered with silica, the metal M of which is selected from the group consisting of Al, Fe, Mg, and mixtures of these metals. Preferably, M represents Al or Mg.

Preferably, the amount of silica present on the surface of this metal hydroxide represents between 5% and 50%, more preferably between 10% and 40%, in particular between 15% and 35% (% by weight of the total weight of coated hydroxide).

"Metal hydroxide" is to be understood to mean any hydroxide, including oxide-hydroxide, of said metals or mixture of metals, whatever its form, crystalline or amorphous, anhydrous or hydrated, and the nature of any impurities therein.

For an optimised compromise with regard to the processability of the compositions, their hysteresis, reinforcement and wear resistance properties, in particular in a tyre, the BET specific surface area of this reinforcing metal hydroxide is preferably of between 50 and 700 $m^2/cm^3$, more preferably of between 100 and 600 $m^2/cm^3$ (for example between 200 and 500 $m^2/cm^3$); its average particle size by mass, $d_w$, is preferably between 20 and 400 nm, more preferably between 50 and 300 nm (for example between 100 and 200 nm).

Furthermore, the intrinsic dispersibility of a filler can be evaluated in known manner using the ultrasound disagglomeration test described in Section I above. Preferably, the reinforcing metal hydroxide has a disagglomeration rate a greater than $1\times10^{-3}$ $\mu m^{-1}$/min, more preferably greater than $4\times10^{-3}$ $\mu m^{-1}$/min.

The physical state in which the reinforcing metal hydroxide may be present is immaterial, whether it be in the form of a powder, microbeads, granules, pellets, balls or any other densified form, provided, of course, that the mode of densification does not adversely affect the essential or preferred characteristics advocated for this filler.

According to a preferred embodiment of the invention, the metal hydroxide used is formed of aggregates (more or less agglomerated together) having an anisometric form, that is to say having an aspect ratio ($F_1=L_1/E_1$) greater than 2.0, more preferably greater than 3.0, $L_1$ representing the average length (or larger dimension) and $E_1$ the average thickness (or smaller dimension, for example the diameter) of said aggregates, these averages being calculated by number. More preferably still, $F_1$ is between 3 and 10.

According to another preferred embodiment, preferably combined with the previous one, it is the primary particles themselves, which constitute the aggregates, which are anisometric, for example in the form of rods, said primary particles having an aspect ratio ($F_2=L_2/E_2$) greater than 2.0, more preferably greater than 3.0, $L_2$ representing the average length (or larger dimension) and $E_2$ the average thickness (or smaller dimension, for example the diameter) of said primary particles, these averages being calculated by number. More preferably still, $F_2$ is between 3 and 20.

In such a case, $L_2$ is preferably between 10 and 400 nm, and $E_2$ is preferably between 5 and 25 nm. More preferably, $L_2$ lies within a range from 20 to 100 nm, and $E_2$ lies within a range from 10 to 20 nm.

The reinforcing metal hydroxide is capable of being prepared by any known process for coating a mineral or organic filler with silica, applied in the present case to a synthetic metal hydroxide, the metal M of which is selected from the group consisting of Al, Fe, Mg and mixtures of these metals.

According to a preferred embodiment, such a coating process comprises the following steps:

starting with a suspension of hydroxide of the metal M in water or any solvent appropriate for synthesis of silica;

effecting the synthesis of silica on the surface of the hydroxide particles;

filtering the suspension obtained, washing the filtrate and drying.

In such a process, the concentration of the suspension of hydroxide of metal M is preferably less than 20 g/l, more preferably less than 10 g/l (for example of the order of 5 g/l). The filtrate is washed one or more times in water or the solvent used for the synthesis of the silica, it being specified that the final washing operation is preferably performed in water.

Then the filtrate thus obtained is dried with a drying means suitable for limiting the agglomeration of the particles of hydroxide upon elimination of the water; The drying means which may be used are known to the person skilled in the art: it is possible, for example, to use cryogenic freeze-drying, spraying, or using supercritical conditions, or to use any other equivalent means which is suitable for avoiding excessive agglomeration, by capillary action, of the hydroxide particles upon the elimination of water.

By way of examples, a coating process inspired by at least one of the following known methods may be used:

method of covering the particles by hydrolysis of tetraethyl orthosilicate (TEOS) in alcohol (M. Ohmori and E. Matijevic, J. Colloid Inter. Sci. 160, 288-292 (1993)), a method which is itself derived from the known process of synthesis of silica under the name of the "Stoeber" method (W. Stoeber, A. Fink, E. Bohm, J. Colloid Inter. Sci. 26, 62-69 (1968));

method of synthesis of silica from a sodium silicate precursor ($Na_2SiO_3$) as described for example in patent application EP-A-0 407 262;

method of covering carbon black with silica as described in Examples 1 and 2 of patent application WO00/05312.

It should be noted that if the starting metal hydroxide is synthesised, it is preferable not to dry the particles thereof before implementing the above coating process, so as to limit as far as possible the risk of the particles agglomerating together before the surface layer of silica is deposited.

The reinforcing metal hydroxide described above may constitute all or only part of the total reinforcing filler, in the latter case associated, for example, with another reinforcing inorganic filler such as a silica, in particular an HD silica, or with conventional carbon black.

Preferably, the reinforcing metal hydroxide constitutes the majority, that is to say more than 50% by weight, of the total reinforcing filler. Advantageously, it represents more than 80%, even more preferably more than 90%, of the total reinforcing filler. It may advantageously constitute 100% of the reinforcing inorganic filler, whether or not associated with carbon black as indicated below.

"Reinforcing inorganic filler" is understood here to mean an inorganic or mineral filler, whatever its colour and its origin (natural or synthetic), also referred to as "white" filler, "clear" filler or alternatively "non-black" filler, in contrast to carbon black, this inorganic filler being capable, on its own, without any other means than an intermediate coupling agent, of reinforcing a rubber composition intended for the manufacture of tyres, in other words which is capable of replacing a conventional tyre-grade carbon black in its reinforcement function.

Suitable possible supplementary reinforcing inorganic fillers are in particular mineral fillers of siliceous type, in particular silica ($SiO_2$), or of aluminous type, in particular alumina ($Al_2O_3$). The silica used may be any reinforcing silica known to the person skilled in the art, in particular any precipitated or fumed silica having a BET surface area and a CTAB specific surface area both of which are less than 450 $m^2/g$, preferably from 30 to 400 $m^2/g$. As highly dispersible (HD) precipitated silicas, mention will be made for example of the silicas Ultrasil 7000 and Ultrasil 7005 from Degussa, the silicas Zeosil 1165 MP, 1135 MP and 1115 MP from Rhodia, the silica Hi-Sil EZ150G from PPG, and the silicas Zeopol 8715, 8745 and 8755 from Huber. Examples of reinforcing aluminas are the aluminas "Baikalox" "A125" or "CR125" from Baikowski, "APA-100RDX" from Condea, "Aluminoxid C" from Degussa or "AKP-G015" from Sumitomo Chemicals.

The reinforcing metal hydroxide may be used also associated with a carbon black, for example a black of type HAF, ISAF, SAF, conventionally used in tyres and particularly in treads for tyres (for example blacks N115, N134, N234, N326, N330, N339, N347, N375, or alternatively, depending on the intended applications, blacks of higher series, for example N660, N683, N772).

The amount of carbon black present in the total reinforcing filler may vary within wide limits; it is preferably less than that of the reinforcing metal hydroxide. Advantageously, carbon black is used in a very small proportion, in a preferred amount of less than 10 phr, more preferably less than 6 phr, for example between 0 and 3 phr (parts by weight per hundred parts of elastomer). Within the ranges indicated, there is a benefit to be had from the colouring properties (black pigmentation agent) and anti-UV properties of the carbon blacks, without furthermore adversely affecting the typical performance provided by the reinforcing metal hydroxide.

Preferably, the amount of total reinforcing filler in the compositions of the invention lies within a range from 20 to 400 phr, more preferably from 30 to 200 phr.

When the compositions of the invention are intended for tyres, in particular for tyre treads, the amount of reinforcing metal hydroxide is preferably greater than 50 phr, more preferably between 50 and 150 phr.

To the reinforcing filler previously described there may be also added, depending on the intended application, inert (non-reinforcing) fillers such as particles of clay, bentonite, talc, chalk, kaolin, usable for example in coloured sidewalls or tyre treads.

II-3. Coupling Agent

It is well-known to the person skilled in the art that it is necessary to use, in the case of a reinforcing inorganic filler, a coupling agent also referred to as "bonding agent", the function of which is to provide the bond or "coupling" between the inorganic filler and the elastomer, while facilitating the dispersion of this inorganic filler within the elastomeric matrix.

The reinforcing metal hydroxide also requires the use of such a coupling agent in order to perform its function of reinforcing filler in the rubber compositions according to the invention.

"Coupling agent" is more precisely understood to mean an agent capable of establishing a sufficient chemical and/or physical connection between the filler in question and the elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler;

X represents a functional group ("X" function) which is capable of bonding physically and/or chemically with the elastomer, for example by means of a sulphur atom;

T represents a group making it possible to link Y and X.

The coupling agents must particularly not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, any coupling agent likely to ensure the effective bonding or coupling between a reinforcing inorganic filler such as silica and a diene elastomer can be used, such as, for example, an organosilane, in particular a sulphurised alkoxysilane, or alternatively a polyorganosiloxane which is at least bifunctional (bearing the X and Y functions mentioned above).

Silica/elastomer coupling agents in particular have been described in a large number of documents, the best known being bifunctional alkoxysilanes such as sulphurised alkoxysilanes. In particular sulphurised alkoxysilanes, which are referred to as "symmetrical" or "asymmetrical" depending on their specific structure, are used, such as those described for example in patent applications or U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129,585, or in the more recent documents U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708,053, U.S. Pat. No. 5,892,085, WO 02/083782 or which describe such known compounds in detail.

Particularly suitable for implementing the invention, without the definition below being limitative, are symmetrical polysulphurised alkoxysilanes which satisfy the following general formula (I):

$$Z\text{-}A\text{-}S_n\text{-}A\text{-}Z,\qquad\qquad\text{(I) in which:}$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

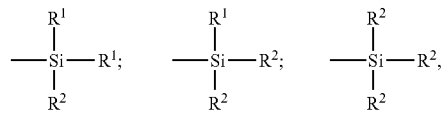

in which:

the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl), the radicals $R^2$, which may or may not be substituted, and may be identical or different, represent a $C_1$-$C_{18}$ alkoxyl group or a $C_5$-$C_{18}$ cycloalkoxyl group (preferably $C_1$-$C_8$ alkoxyl groups or $C_5$-$C_8$ cycloalkoxyl groups, more preferably $C_1$-$C_4$ alkoxyl groups, in particular methoxyl and/or ethoxyl).

In the case of a mixture of polysulphurised alkoxysilanes of Formula (I) above, in particular conventional, commercially available, mixtures, the average value of the "n"s is a fractional number, preferably between 2 and 5, more preferably close to 4. However, the invention may also be implemented advantageously for example with disulphurised alkoxysilanes (n=2).

As examples of polysulphurised silanes, mention will be made more particularly of the polysulphides (in particular disulphides, trisulphides or tetrasulphides) of bis-(($C_1$-$C_4$)alkoxyl-($C_1$-$C_4$)alkylsilyl-($C_1$-$C_4$)alkyl), such as for example the polysulphides of bis(3-trimethoxysilylpropyl) or of bis(3-triethoxysilylpropyl) such as bis(3-triethoxysilylpropyl) tetrasulphide, abbreviated to TESPT, of formula $[(C_2H_5O)_3Si(CH_2)_3S_2]_2$ or bis-(triethoxysilylpropyl) disulphide, abbreviated to TESPD, of formula $[(C_2H_5O)_3Si(CH_2)_3S]_2$.

TESPD is sold, for example, by Degussa under the name Si75 (in the form of a mixture of disulphide—75% by weight—and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

Mention will also be made as preferred coupling agents of the polysulphides (in particular disulphides, trisulphides or tetrasulphides) of bis-(mono($C_1$-$C_4$)alkoxyl-di($C_1$-$C_4$)alkylsilylpropyl), more particularly bis-monoethoxydimethylsilylpropyl tetrasulphide as described in application WO 02/083782.

As examples of coupling agents other than the aforementioned polysulphurised alkoxysilanes, mention will be made in particular of the bifunctional polyorganosiloxanes such as described for example in applications WO99/02602 or WO01/96442, or alternatively the hydroxysilane polysulphides such as described in applications WO02/30939 and WO 02/31041.

The person skilled in the art will be able to adjust the content of coupling agent in the compositions of the invention, according to the intended application, the nature of the elastomer used and the quantity of reinforcing metal hydroxide, supplemented if applicable by any other inorganic filler used as complementary reinforcing filler.

The amount of coupling agent, reduced to the weight of diene elastomer, is preferably between 0.1 and 15 phr, more preferably between 0.5 and 10 phr.

The coupling agent used could be grafted beforehand (via the "X" function) on to the diene elastomer of the composition of the invention, the elastomer thus functionalised or "precoupled" then comprising the free "Y" function for the reinforcing metal hydroxide. The coupling agent could also be grafted beforehand (via the "Y" function) on to the reinforcing metal hydroxide, the filler thus "precoupled" then being able to be bonded to the diene elastomer by means of the free "X" functions. However, it is preferred to use the coupling agent in the free (i.e. non-grafted) state or grafted on to the reinforcing metal hydroxide, in particular for reasons of better processability of the compositions in the uncured state.

II-4. Various Additives

The compositions according to the invention may contain, in addition to the compounds already described, the additives usually used in diene rubber compositions intended for the manufacture of ground contact systems for motor vehicles, in particular tyres, such as, for example, plasticisers or extender oils, whether the latter be aromatic or non-aromatic in nature, in particular oils which are only very slightly aromatic or non-aromatic (e.g. naphthenic or paraffinic oils, MES or TDAE oils) and/or hydrocarbon plasticising resins of high Tg (preferably greater than 30° C.), pigments, protective agents of the type antioxidants, antiozonants, anti-fatigue agents, coupling activators, methylene acceptors and donors, bismaleimides or other reinforcing resins such as described for example in WO02/10269, a cross-linking system based either on sulphur or on sulphur and/or peroxide donors, vulcanisation accelerators, vulcanisation activators, systems promoting adhesion of the rubber to the metal or textile, anti-reversion agents such as for example sodium hexathiosulphonate or N,N'-m-phenylene-biscitraconimide, etc. The person skilled in the art will be able to adjust the formulation of the composition according to his particular requirements.

The rubber compositions according to the invention may also contain, in addition to the aforementioned coupling agents, agents (comprising for example the single Y function) for covering the reinforcing metal hydroxide, or more generally processing aids liable, owing to an improvement in the dispersion of the filler in the rubber matrix and to a reduction in the viscosity of the compositions, to improve their processability in the uncured state, these agents, used, for example, in a preferred amount of between 0.5 and 3 phr, being, for example, alkylalkoxysilanes (in particular alkyltriethoxysilanes, such as for example 1-octyl-triethoxysilane sold by Degussa-Hüls under the name Dynasylan Octeo, or 1-hexadecyl-triethoxysilane sold by Degussa-Hüls under the name Si216), polyols, polyethers (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

II-5. Preparation of the Rubber Compositions

The compositions are produced in suitable mixers, using two successive preparation phases well-known to the person skilled in the art: a first phase of thermomechanical working or kneading ("non-productive" phase) at high temperature, up to a maximum temperature ($T_{max}$) of between 110° C. and 190° C., preferably between 130° C. and 180° C., followed by a second phase of mechanical working ("productive" phase) at lower temperature, typically less than 110° C., for example between 60° C. and 100° C., during which finishing phase the cross-linking or vulcanisation system is incorporated.

The manufacturing process according to the invention is characterised in that at least the reinforcing filler and the coupling agent are incorporated by kneading in the diene elastomer during the first, so-called non-productive, phase, that is to say that at least these different base constituents are introduced into the mixer and kneaded thermomechanically, in one or more stages, until a maximum temperature of between 110° C. and 190° C., preferably of between 130° C. and 180° C., is reached.

By way of example, the first (non-productive) phase is effected in a single thermomechanical stage during which all the base constituents necessary, any complementary covering agents or processing agents and various other additives, with the exception of the vulcanisation system, are introduced into a suitable mixer such as a conventional internal mixer. The total duration of the kneading, in this non-productive phase, is preferably between 1 and 15 minutes. After cooling of the mixture thus obtained, the vulcanisation system is then incorporated at low temperature, generally in an external mixer such as an open mill; the entire composition is then mixed (productive phase) for several minutes, for example between 2 and 15 minutes.

The final composition thus obtained is then calendered, for example in the form of a film or a sheet, in particular for characterisation in the laboratory, or alternatively extruded, in order to form for example a rubber profiled element used for manufacturing semi-finished products such as treads, crown plies, sidewalls, carcass plies, beads, protectors, inner tubes or airtight internal rubbers for tubeless tyres.

The vulcanisation (or curing) is carried out in known manner at a temperature generally between 130° C. and 200° C., under pressure, for a sufficient time which may vary, for example, between 5 and 90 minutes, depending, in particular, on the curing temperature, the vulcanisation system adopted, the vulcanisation kinetics of the composition in question or alternatively the size of the tyre.

The vulcanisation system proper is preferably based on sulphur and a primary vulcanisation accelerator, in particular an accelerator of the sulphenamide type. To this basic vulcanisation system there may be added, incorporated during the first, non-productive, phase and/or during the productive phase, various known secondary accelerators or vulcanisation activators such as, for example, zinc oxide, stearic acid, guanidine derivatives, etc. The sulphur is used in a preferred amount of between 0.5 and 10 phr, more preferably of between 0.5 and 5.0 phr, for example between 0.5 and 3.0 phr when the invention is applied to a tyre tread. The primary vulcanisation accelerator is used in a preferred amount of between 0.5 and 10 phr, more preferably of between 0.5 and 5.0 phr in particular when the invention applies to a tyre tread.

It goes without saying that the invention relates to the rubber compositions previously described, both in the "uncured" state (i.e. before curing) and in the "cured" or vulcanised state (i.e. after cross-linking or vulcanisation).

The compositions according to the invention may be used alone or in a mixture with any other rubber composition usable for manufacturing tyres.

III. EXAMPLES OF EMBODIMENT OF THE INVENTION

III-1. Synthesis of the Reinforcing Metal Hydroxide

Equipment Used:
  5 litre double-casing reactor;
  stirrer motor (Heidolph);
  thermostatically-controlled bath;
  centrifugal extractor (Rousselet—type RC30VxR);
  freeze-dryer (Christ Gamma 2-20);
  1500 W ultrasound probe.

Precursors Used:
  absolute ethanol (Prolabo—Ref. 20821.296);
  ammonium hydroxide $NH_4OH$ (Fluka—Ref. 09860);
  tetraethyl orthosilicate (TEOS) (Aldrich—Ref. 13190-2);
  aluminium hydroxide AlOOH (boehmite of rod-like morphology);
  bi-deionised water.

Operating Method:
The starting metal hydroxide (filler referenced "B" in the following tests) is an aluminium oxide-hydroxide (AlOOH—crystalline form "boehmite"), the secondary particles (aggregates) of which are formed of primary particles in the form of rods of form factor $F_2$ equal to 4 approximately ($L_2=40$ nm and $E_2=10$ nm); these secondary particles have the properties of density and of BET surface area indicated in the appended Table 1.

It was synthesised by the known operating method described in "Nanostructured ceramic powders by hydrothermal synthesis and their application", C. Kaya et al, Microporous and Mesoporous Materials, 54, pp. 37-49, 2002, from a hydroxyaluminium diacetate precursor $(CH_3COO)_2Al(OH)$, in an aqueous solution of acetic acid at high pressure and temperature (approximately 200° C.).

The particles of filler B are then covered by uniform layers of silica by means of the hydrolysis of the tetraethyl orthosilicate (TEOS) in ethanol by the Stoeber method.

In detail, the procedure was as follows: 4.47 l g of ethanol is introduced into a 5 l (litres) reactor, provided with a double casing. The temperature of the medium is adjusted to 40° C. by a thermostatically-controlled bath connected to the double casing. The reaction medium is homogenised by a Teflon® stirrer having six faces, coupled to a motor rotating at a speed of 300 rpm. A volume of 168.6 ml 12 M ammonium hydroxide is then added, and 73.2 ml of bi-deionised water. The mix is then kept stirred for 30 min at 40° C. A suspension of 25 g of AlOOH in 200 ml of ethanol is then introduced. This suspension is incorporated after having been ultrasound-treated using a 1500 W probe used at 100% power for 30 minutes. Then 93 ml of 4.47 M tetraethyl orthosilicate is added rapidly. The reaction medium is kept stirred at a temperature of 40° C. for one hour. The product is introduced into the extractor by means of a peristaltic pump at a flow rate of 30 ml/min in order to be extracted (speed of rotation of the extractor: 600 rpm) then washed with 1 l ethanol and 12 l of water (flow rate of the peristaltic pump: 100 ml/min; speed of rotation of the extractor: 1000 rpm). It is then dried by freeze-drying under the following conditions: 48 hours of main drying at −15° C. and 1.030 mbar; then 12 hours of final drying at 0° C. in a dynamic vacuum. The product is finally sieved (<400 μm).

27 g of AlOOH particles covered with $SiO_2$ are thus obtained. This filler, referenced filler C in the following tests, has the properties of density and of BET surface area indicated in Table 1.

Characterised using a TEM (transmission electron microscope), these particles are in the form of aggregates of primary particles in the form of rods, said rods having an average length $l_2$ of the order of 40-50 nm and an average thickness $E_2$ of approximately 10-15 μm; their form factor $F_2$ is therefore equal to 4 approximately.

For the characterisation by TEM, by way of example the following operating method was applied: a test portion of 12 mg of filler was dispersed in isopropanol using an ultrasound probe. A drop of the suspension was deposited on a first, nickel, grid covered with a continuous carbon membrane ("Formvar"), then on a second, copper, grid covered with a holey carbon membrane. The observations were carried out on a Philips TEM (ref. CM 200) operating at a voltage of 200 kV and equipped with a camera ("Megaview").

An X-ray diffraction pattern (Rigaku —RU300 rotating-anode generator; Cu tube; $\lambda=1.5418$ Å; P 40 kV*200 mA; Ni filter) reveals the presence of the predominant boehmite phase and an amorphous halo of silica. Analysis by X-ray fluorescence (Philips "PW1400" λ dispersion spectrometer and Sc anode tube), carried out on a sample containing several mg of powder [which] is compacted under 10 tonnes of pressure with boric acid to form a pellet, gives a weight percentage of silica of the order of 20%.

Finally, NMR analysis readily makes it possible to confirm that the layer of silica is truly fixed securely to the metal hydroxide, by means of covalent bonds. The NMR spectra are obtained in known manner, on a Bruker ASX 200 MHz spectrometer, fitted with a 4,7-Tesla superconductive magnet (Larmor frequency of the silicon equal to 39.76 MHz). To acquire the signal, the samples in powder form are placed in a cylindrical zirconium oxide sample holder (rotor) of approximately 0.3 cm$^3$, which rotates at the magic angle at a frequency of 4 KHz. During the observation of this signal, high-power decoupling is used to average the proton-silicon interactions to zero. The CPMAS spectrum exhibits a shoulder at −80 ppm which is not characteristic of silica, arising from the covalent bond Si—O—Al.

III-2. Preparation of the Compositions

The compositions tested hereafter are prepared as follows: the diene elastomer (or mixture of diene elastomers, if applicable) is introduced into an internal mixer filled to 70% to 75%, the initial tank temperature of which is approximately 90° C.; then, after an appropriate kneading time, for example of the order of 1 min., all the other ingredients are added, including the filler and the associated coupling agent, with the exception of the vulcanisation system. Thermomechanical working of a duration of about 12 minutes is then performed, with an average blade speed of 70 rpm, until a dropping temperature of about 160° C. is obtained.

The mixture thus obtained is recovered, it is cooled and then the vulcanisation system (sulphur and sulphenamide-type primary accelerator) is added on an external mixer (homo-finisher) at 30° C., by mixing everything (productive phase) for a suitable time (for example 8 minutes approximately).

The compositions thus obtained are then calendered either in the form of plates (thickness of 2 to 3 mm) of rubber in order to measure their mechanical properties, or extruded in the form of tyre treads. Vulcanisation (curing) is carried out at 150° C. for 40 min, under pressure.

In the following tests, the reinforcing metal hydroxide is used in a preferred amount greater than 50 phr; it furthermore constitutes all or at the very least more than 90% by weight of the entire reinforcing filler, a minority fraction (less than 10%) of the latter being formed by carbon black.

III-3. Tests

The primary aim of this test is to demonstrate the superiority of a reinforcing metal hydroxide as described previously, compared in particular to a conventional HD silica, from the point of view of the curing kinetics.

For this, four compositions used for the manufacture of treads are compared. The diene elastomer is an SBR prepared in solution (SSBR), comprising 25% by mass of styrene, the polybutadiene units present being 40% 1,2-polybutadiene units and 60% trans-1,4 polybutadiene units (Tg=−38° C.).

These four compositions are substantially identical, with the exception of their nature, to the filler used:
  composition C-1: filler A (silica);
  composition C-2: filler B (AlOOH);
  composition C-3: mix (50/50 by volume) filler A+filler B;
  composition C-4: filler C (filler B covered with silica).

Only composition C-4 is therefore in accordance with the invention.

The HD silica (filler A) selected for the control composition C-1 is a tyre-grade silica having in known manner a very high reinforcing ability ("Zeosil" type "1165 MP" from Rhodia), usually used for reinforcing passenger-tyre treads of low energy consumption.

In these different compositions, the TESPT coupling agent was introduced in a substantially equivalent amount of surface coverage, taking into account the differences in density and in BET surface area of the fillers used, relative to the silica of the control composition C-1.

Tables 2 and 3 show in succession the formulation of the different compositions (Table 2-amount of the different products expressed in phr), and their properties before and after curing at 150° C. for 40 minutes (Table 3).

On reading the results of Table 3, it will be noted that the composition C-4 according to the invention, compared with the control composition C-1, is characterised first of all by a ratio of moduli (M300/M100) which is very close, by a hysteresis (tan($\delta$)$_{max}$) which is slightly lower (therefore better), both indications of reinforcement known to the person skilled in the art which attest to the reinforcing ability of the filler C (metal hydroxide covered with silica).

Such is not the case for filler B (crude metal hydroxide, not covered with silica) of composition C-2, nor for that matter for the mixture of HD silica and filler B of composition C-3, both of which exhibit a lower ratio of moduli (M300/M100), a hysteresis (tan($\delta$)$_{max}$) which is distinctly increased (therefore less good), compared with the control solution C-1.

Above all, surprisingly, the composition of the invention C-4 reveals vulcanisation kinetics (illustrated by the parameter K) which are increased very substantially (approximately by a factor of 2.6) compared with the HD silica (base 100 in relative units), thus bringing the latter back to what is usually found for equivalent rubber compositions reinforced with carbon blacks.

Furthermore, if the induction delay Ti of compositions C-2 and C-3 (1 min approximately) is reduced in a manner which is virtually crippling from the industrial point of view, compared with the control solution (10 min), it will be noted that the composition C-4 of the invention has the significant and equally unexpected advantage of combining, with its greatly accelerated curing kinetics (K), a resistance to scorching (Ti=6.5 min) which remains entirely acceptable from the point of view of the industrial processability of the compositions in the uncured state.

Thus, the reinforcing metal hydroxide previously described offers the compositions of the invention an advantageous and unexpected compromise of properties, which properties could in no way lead one to expect, as demonstrated in the preceding examples, the results obtained hitherto with metal hydroxides, in particular with aluminium oxides and/or hydroxides or even with mixtures of such oxides and/or hydroxides with HD silicas.

The preferred anisometric nature of the particles of reinforcing metal hydroxide furthermore imparts advantageous anisotropic properties to the compositions of the invention, which can be easily identified by comparing the rigidities by tension in the direction of calendering and in the direction perpendicular to calendering. Such anisotropic properties are advantageously usable for separating the mechanical properties of the compositions, and therefore adjusting the response of the latter to the specific stress modes which can be applied thereto.

It had generally been accepted hitherto that anisometric fillers were insufficiently reinforcing, incapable owing to their relatively large size of replacing, in a true reinforcing filler function, a conventional filler for tyres such as carbon black or an HD silica. Henceforth, thanks to the invention, it therefore becomes possible to combine, with one and the same filler, reinforcement and anisotropic properties of the rubber compositions.

TABLE 1

| | filler: | | |
|---|---|---|---|
| | A | B | C |
| density He (g/cm³) | 2.15 | 2.84 | 2.65 |
| BET surface area (m²/g) | 155 | 147 | 176 |
| BET surface area (m²/cm³) | 333 | 417 | 466 |

TABLE 2

| | Composition No. | | | |
|---|---|---|---|---|
| | C-1 | C-2 | C-3 | C-4 |
| SSBR (1) | 100 | 100 | 100 | 100 |
| filler A | 52.5 | — | 26.3 | — |
| filler B | — | 74 | 37.0 | — |
| filler C | — | — | — | 67 |
| coupling agent (2) | 4.2 | 5.4 | 4.8 | 4.9 |
| carbon black (N234) | 2 | 2 | 2 | 2 |
| ZnO | 2.5 | 2.5 | 2.5 | 2.5 |
| stearic acid | 2 | 2 | 2 | 2 |
| antioxidant (3) | 1.9 | 1.9 | 1.9 | 1.9 |
| sulphur | 1.5 | 1.5 | 1.5 | 1.5 |
| accelerator (4) | 2.5 | 2.5 | 2.5 | 2.5 |

(1) solution SBR;
(2) TESPT ("Si69" from DEGUSSA-HÜLS);
(3) N-1,3-dimethylbutyl-N-phenylparaphenylenediamine ("Santoflex 6-PPD" from Flexsys);
(4) N-cyclohexyl-2-benzothiazylsulphenamide ("Santocure CBS" from Flexsys).

TABLE 3

| | Composition No. | | | |
|---|---|---|---|---|
| | C-1 | C-2 | C-3 | C-4 |
| M300/M100 | 3.0 | 2.5 | 2.5 | 2.8 |
| breaking stress (MPa) | 18.5 | 19.2 | 23.9 | 15.5 |
| elongation at break (%) | 337 | 341 | 460 | 368 |
| Ti (min) | 10 | 0.9 | 1.3 | 6.4 |
| K_(min⁻¹) | 0.098 | 0.172 | 0.168 | 0.259 |
| K (relative units) | 100 | 176 | 171 | 264 |
| Tan(δ)$_{max}$ | 0.207 | 0.397 | 0.303 | 0.194 |

The invention claimed is:

1. A rubber composition comprising at least a diene elastomer, a reinforcing filler and a coupling agent, wherein the filler comprises a synthetic metal hydroxide covered with silica, the metal of the hydroxide being selected from the group consisting of Al, Fe, Mg and mixtures thereof.

2. The composition according to claim 1, the diene elastomer being selected from the group consisting of polybutadienes, synthetic polyisoprenes, natural rubber, butadiene/styrene copolymers, butadiene/isoprene copolymers, isoprene/styrene copolymers, butadiene/styrene/isoprene copolymers and mixtures thereof.

3. The composition according to claim 1, the coupling agent being a silane or a polysiloxane which is at least bifunctional.

4. The composition according to claim 2, the coupling agent being a silane or a polysiloxane which is at least bifunctional.

5. The composition according to claim 1, the amount (% by weight) of silica of the metal hydroxide representing between 5% and 50% of the total weight of the covered hydroxide.

6. The composition according to claim 5, the amount of silica of the metal hydroxide representing between 10% and 40% of the total weight of the covered hydroxide.

7. The composition according to claim 1, the amount of the metal hydroxide in the composition being greater than 50 phr.

8. The composition according to claim 1, the metal hydroxide comprising aggregates (or secondary particles) of primary particles, the aggregates being of anisometric form with an aspect ratio ($F_1 = L_1/E_1$) of greater than 2, wherein $L_1$ represents the average length and $E_1$ represents the average thickness by number of the aggregates.

9. The composition according to claim 8, the aspect ratio ($F_1$) of the aggregates being greater than 3.

10. The composition according to claim 9, the aspect ratio ($F_1$) of the aggregates being between 3 and 10.

11. The composition according to claim 1, the metal hydroxide comprising aggregates (or secondary particles) of primary particles, the primary particles being of anisometric form with an aspect ratio ($F_2 = L_2/E_2$) of greater than 2, wherein $L_2$ represents the average length and $E_2$ represents the average thickness by number of the primary particles.

12. The composition according to claim 11, the aspect ratio ($F_2$) of the primary particles being greater than 3.

13. The composition according to claim 12, the aspect ratio ($F_2$) of the primary particles being between 3 and 20.

14. The composition according to claim 11, $L_2$ being between 10 and 400 nm, and $E_2$ being between 5 and 25 nm.

15. The composition according to claim 14, $L_2$ being within a range from 20 to 100 nm, and $E_2$ being within a range from 10 to 20 nm.

16. A process for obtaining a diene rubber composition having improved vulcanisation kinetics, usable for the manufacture of tires, which comprises at least one diene elastomer, at least one reinforcing filler and a coupling agent, wherein the filler comprises a synthetic metal hydroxide covered with silica, the metal of the hydroxide being selected from the group consisting of Al, Fe, Mg and mixtures thereof, the process comprising kneading the entire mixture thermomechanically, in one or more stages, until a maximum temperature of between 110° C. and 190° C. is reached.

17. The process according to claim 16, the diene elastomer being selected from the group consisting of polybutadienes, synthetic polyisoprenes, natural rubber, butadiene/styrene copolymers, butadiene/isoprene copolymers, isoprene/styrene copolymers, butadiene/styrene/isoprene copolymers and mixtures thereof.

18. The process according to claim 16, the coupling agent being a silane or a polysiloxane which is at least bifunctional.

19. The process according to claim 17, the coupling agent being a silane or a polysiloxane which is at least bifunctional.

20. The process according to claim 16, the amount (% by weight) of silica of the metal hydroxide representing between 5% and 50% of the total weight of the covered hydroxide.

21. The process according to claim 20, the amount of silica of the metal hydroxide representing between 10% and 40% of the total weight of the covered hydroxide.

22. The process according to claim 16, the amount of the metal hydroxide in the composition being greater than 50 phr.

23. The process according to claim 16, the metal hydroxide comprising aggregates (or secondary particles) of primary particles, the aggregates being of anisometric form with an aspect ratio ($F_1 = L_1/E_1$) of greater than 2, wherein $L_1$ represents the average length and $E_1$ represents the average thickness by number of the aggregates.

24. The process according to claim 23, the aspect ratio ($F_1$) of the aggregates being greater than 3.

25. The process according to claim 24, the aspect ratio ($F_1$) of the aggregates being between 3 and 10.

26. The process according to claim 16, the metal hydroxide comprising aggregates (or secondary particles) of primary particles, the primary particles being of anisometric form with an aspect ratio ($F_2=L_2/E_2$) of greater than 2, wherein $L_2$ represents the average length and $E_2$ represents the average thickness by number of the primary particles.

27. The process according to claim 26, the aspect ratio ($F_2$) of the primary particles being greater than 3.

28. The process according to claim 27, the aspect ratio ($F_2$) of the primary particles being between 3 and 20.

29. The process according to claim 26, $L_2$ being between 10 and 400 nm, and $E_2$ being between 5 and 25 nm.

30. The process according to claim 29, $L_2$ being within a range from 20 to 100 nm, and $E_2$ being within a range from 10 to 20 nm.

31. A rubber article comprising the composition according to claim 1.

32. A tire comprising the rubber composition according to claim 1.

33. A tire tread comprising the rubber composition according to claim 1.

* * * * *